(12) United States Patent
Hasegawa et al.

(10) Patent No.: US 8,913,217 B2
(45) Date of Patent: Dec. 16, 2014

(54) LIQUID CRYSTAL DISPLAY DEVICE

(75) Inventors: Masahiro Hasegawa, Osaka (JP); Akira Sakai, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 211 days.

(21) Appl. No.: 13/808,330

(22) PCT Filed: May 10, 2011

(86) PCT No.: PCT/JP2011/060736
§ 371 (c)(1),
(2), (4) Date: Jan. 4, 2013

(87) PCT Pub. No.: WO2012/005050
PCT Pub. Date: Jan. 12, 2012

(65) Prior Publication Data
US 2013/0114027 A1 May 9, 2013

(30) Foreign Application Priority Data
Jul. 5, 2010 (JP) .................... 2010-153183

(51) Int. Cl.
*G02F 1/1335* (2006.01)
*G02F 1/1343* (2006.01)
*G02F 1/1337* (2006.01)
*G02B 5/30* (2006.01)

(52) U.S. Cl.
CPC .......... *G02B 5/305* (2013.01); *G02F 1/133528* (2013.01); *G02F 2001/133507* (2013.01); *G02F 2001/133567* (2013.01)
USPC .............. 349/96; 349/141; 349/117; 349/130

(58) Field of Classification Search
CPC ............... G02F 1/133528; G02F 1/133536; G02F 1/13363; G02F 1/133634; G02F 1/1393; G02F 1/133707; G02B 5/3033; G02B 5/3083
USPC .................... 349/96, 141, 117, 130
See application file for complete search history.

(56) References Cited

U.S. PATENT DOCUMENTS

| | | | |
|---|---|---|---|
| 8,013,954 B2 * | 9/2011 | Hasegawa et al. | 349/96 |
| 2008/0007680 A1 | 1/2008 | Kitagawa et al. | |
| 2009/0207347 A1 | 8/2009 | Shimizu et al. | |
| 2009/0316086 A1 | 12/2009 | Ishii et al. | |
| 2010/0141873 A1 | 6/2010 | Kinjo et al. | |

(Continued)

FOREIGN PATENT DOCUMENTS

| | | |
|---|---|---|
| JP | 2001-74935 | 3/2001 |
| JP | 2007-298958 | 11/2007 |

(Continued)

OTHER PUBLICATIONS

International Search Report for PCT/JP2011/060736, mailed Jul. 19, 2011.

*Primary Examiner* — Mike Qi
(74) *Attorney, Agent, or Firm* — Nixon & Vanderhye, P.C.

(57) ABSTRACT

The present invention provides a liquid crystal display device that can achieve sufficient front contrast ratio and front white brightness at the same time. The present invention is a liquid crystal display device including a front polarizing plate, a liquid crystal cell, a back polarizing plate, and an optical element having polarization characteristics, which are arranged in the stated order, wherein the back polarizing plate has a lower contrast than the front polarizing plate, and there is substantially no air layer between the back polarizing plate and the optical element having polarization characteristics.

18 Claims, 3 Drawing Sheets

(56) References Cited

U.S. PATENT DOCUMENTS

| | | | |
|---|---|---|---|
| 2010/0182546 A1* | 7/2010 | Maezawa et al. | 349/96 |
| 2011/0109850 A1 | 5/2011 | Hasegawa et al. | |

FOREIGN PATENT DOCUMENTS

| | | |
|---|---|---|
| JP | 2007-328217 | 12/2007 |
| JP | 2008-9388 | 1/2008 |
| JP | 2008-15307 | 1/2008 |
| JP | 2008-33250 | 2/2008 |
| JP | 2008-58980 | 3/2008 |
| JP | 2008-102227 | 5/2008 |
| JP | 2010-33033 | 2/2010 |
| WO | WO 2010/095308 | 8/2010 |

* cited by examiner

LIQUID CRYSTAL DISPLAY DEVICE

This application is the U.S. national phase of International Application No. PCT/JP2011/060736 filed 10 May 2011 which designated the U.S. and claims priority to JP Patent Application No. 2010-153183 filed 5 Jul. 2010, the entire contents of each of which are hereby incorporated by reference.

TECHNICAL FIELD

The present invention relates to a liquid crystal display device. More specifically, the present invention relates to a liquid crystal display device suitable as a liquid crystal display device that includes a front polarizing plate, a liquid crystal cell, a back polarizing plate, and an optical element having polarization characteristics, which are arranged in the stated order.

BACKGROUND ART

Liquid crystal display devices are elements that display characters and images using electro-optical characteristics of liquid crystal molecules, and are widely used for products such as cell phones, laptops, and liquid crystal display televisions. The liquid crystal display devices usually include a liquid crystal panel having polarizing plates (a front polarizing plate and a back polarizing plate) sandwiching a liquid crystal cell. For example, a normally black type liquid crystal display device can display a black image when no voltage is applied. In recent years, along with a higher-resolution and more versatile applications of the liquid crystal display devices, there is a demand for a liquid crystal panel having a higher contrast ratio, which can more clearly display characters and images.

Examples of conventional methods for enhancing the front contrast ratio of a liquid crystal panel include a method for reducing scattering components inside a liquid crystal cell and a method for decreasing the transmittance of a polarizing plate and increasing the degree of polarization. The method for reducing scattering components inside a liquid crystal cell is not easily applicable because it requires a design change of the cell structure and the like. In contrast, the method for decreasing the transmittance of a polarizing plate and increasing the degree of polarization is known as a method that can relatively easily enhance the front contrast ratio because the method is applicable simply by changing production conditions of the polarizing plate.

For example, as a technique to enhance the front contrast ratio, there is disclosed a liquid crystal panel having a liquid crystal cell, a first polarizing plate disposed on one side of the liquid crystal cell, and a second polarizing plate disposed on the other side of the liquid crystal cell, wherein the second polarizing plate has a higher transmittance than the first polarizing plate (for example, see Patent Literature 1 to 5).

In regard to a technique to adjust the transmittance of a pair of polarizing plates, there is disclosed a liquid crystal panel that at least includes a liquid crystal cell, a first polarizing plate disposed on one side of the liquid crystal cell, and a second polarizing plate disposed on the other side of the liquid crystal cell, wherein the first polarizing plate includes a first polarizer and a first retardation layer disposed on the first polarizer on the side facing the liquid crystal cell; the second polarizing plate includes a second polarizer and a second retardation layer disposed on the second polarizer on the side facing the liquid crystal cell; the index ellipsoid of the first retardation layer satisfies a relationship of nx>ny≥nz; the index ellipsoid of the second retardation layer satisfies a relationship of nx=ny>nz; and a transmittance (T1) of the first polarizing plate is higher than a transmittance (T2) of the second polarizing plate (for example, see Patent Literature 6).

Further, liquid crystal display devices provided with, in addition to the polarizing plates, a brightness enhancement film, a wire grid polarizer, and the like as optical elements having polarization characteristics have been developed. More specifically, in regard to a liquid crystal display device provided with a wire grid polarizer and the like, there is disclosed a liquid crystal display device provided with a wire grid-type polarization optical element, wherein the polarization optical element has a structure including an anisotropically-shaped metal part and a dielectric part, the structure being obtained by forming a metal membrane on a transparent, flexible substrate and stretching the substrate and the metal membrane at a temperature below the melting point of the metal membrane; and the length in a shorter direction of the structure is shorter than the wavelength of light, and the length in a longer direction of the structure is longer than the wavelength of light (for example, see Patent Literature 7).

PATENT LITERATURE

Patent Literature 1: JP-A No. 2007-298958
Patent Literature 2: JP-A No. 2008-9388
Patent Literature 3: JP-A No. 2008-15307
Patent Literature 4: JP-A No. 2008-33250
Patent Literature 5: JP-A No. 2008-58980
Patent Literature 6: JP-A No. 2007-328217
Patent Literature 7: JP-A No. 2001-74935

SUMMARY OF INVENTION

Technical Problem

However, while the methods disclosed in Patent Literatures 1 to 5 for adjusting the transmittances of the polarizing plates can enhance the front contrast ratio, the transmittance of the polarizing plates must be decreased, which unfortunately causes a decrease in the front white brightness at the same time. These methods thus needed improvement in this respect.

Further, the technique disclosed in Patent Literature 6 is for providing a liquid crystal display device in which the amount of light leakage in an oblique direction is small. It is not a technique for enhancing the front contrast ratio.

The present invention has been made in view of the above state of the art, and aims to provide a liquid crystal display device that can achieve sufficient front contrast ratio and front white brightness at the same time.

Solution to Problem

As a result of various studies on liquid crystal display devices that would be able to achieve sufficient front contrast ratio and front white brightness at the same time, the present inventors focused on optical elements having polarization characteristics such as brightness enhancement film, wire grid polarizer, and the like. Then, the present inventors lowered the contrast of the back polarizing plate than that of the front polarizing plate, and prevented the entrance of air (gas) between the back polarizing plate and the optical element having polarization characteristics, and they thereby found that such a configuration can enhance the front white brightness of the liquid crystal display device while maintaining the front contrast ratio. The present inventors found that the above-described problem can be successfully solved by the configuration described above, and arrived at the present invention.

Specifically, an aspect of the present invention is a liquid crystal display device including a front polarizing plate, a liquid crystal cell, a back polarizing plate, and an optical element having polarization characteristics in that order, wherein the back polarizing plate has a lower contrast than the front polarizing plate, and there is substantially no air layer between the back polarizing plate and the optical element having polarization characteristics.

This makes it possible to maintain the front contrast ratio of the liquid crystal display device and enhance the front white brightness thereof at the same time. In other words, sufficient front contrast ratio and front white brightness can be achieved at the same time.

The phrase "there is substantially no air layer between the back polarizing plate and the optical element having polarization characteristics" means that there may be absolutely no air therebetween or that there may be some amount of air therebetween as long as the amount is within the range that does not impair the effect of the present invention. In the latter configuration, there may be some air that is generated when the back polarizing plate and the optical element are bonded to each other.

The configuration of the liquid crystal display device is not particularly limited as long as it essentially includes the components described above. The liquid crystal display device may or may not include other components.

Preferable embodiments of the liquid crystal display device are mentioned in more detail below. The following embodiments may be employed in combination.

The back polarizing plate may include a protective layer on the side facing the optical element having polarization characteristics, and the optical element having polarization characteristics may be attached to the protective layer (hereinafter referred to as a "first embodiment"). Alternatively, the optical element having polarization characteristics may be attached to a polarizer of the back polarizing plate (hereinafter referred to as a "second embodiment"). In these manners, the liquid crystal display device can be easily achieved. Further, according to the first embodiment, the liquid crystal display device can be produced using a commercially available polarizing plate and a commercially available optical element having polarization characteristics, i.e., general-purpose members. According to the second embodiment, the device can be made thinner because a protective film can be dispensed with.

In the first embodiment, the optical element having polarization characteristics is preferably attached to the protective layer via an adhesive layer. Accordingly, the formation of an air interface between the optical element having polarization characteristics and the protective layer of the back polarizing plate can be effectively prevented. This effectively improves a low white brightness caused by interface reflection between the optical element having polarization characteristics and the protective layer of the back polarizing plate.

From the viewpoint of improving the durability of the polarizing element, the optical element having polarization characteristics of the second embodiment is preferably attached to the polarizing element via a bonding layer. Also in this way, the formation of an air interface between the optical element having polarization characteristics and the polarizing element of the back polarizing plate can be effectively prevented. This effectively improves a low white brightness caused by interface reflection that occurs between the optical element having polarization characteristics and the protective layer of the back polarizing plate.

Note that an isotropic film may be disposed between the back polarizing plate and the optical element having polarization characteristics, or a birefringent layer may be disposed between the back polarizing plate and the optical element having polarization characteristics. Even in the latter case, the birefringence function of the birefringent layer can be rendered substantially ineffective by setting a slow axis of the birefringent layer in a direction generally parallel to or generally perpendicular to a transmission axis of each of the back polarizing plate and the optical element having polarization characteristics, thereby obtaining an effect similar to that obtained in the case where a birefringent layer is not provided between the back polarizing plate and the optical element having polarization characteristics.

Note that the birefringent layer refers to an optically anisotropic layer in which either the absolute value of an in-plane retardation value Re[550] or the absolute value of a thickness retardation value Rth[550] is 10 nm or more, preferably 20 nm or more.

Further, the isotropic film refers to a film in which both of the absolute value of the in-plane retardation value Re[550] and the absolute value of the thickness retardation value Rth[550] are 10 nm or less, preferably 5 nm or less, and more preferably 2 nm or less.

The contrast of the back polarizing plate is 300 or higher, and the difference in the contrast between the front polarizing plate and the back polarizing plate is preferably 3500 or higher. This makes it possible to effectively achieve the effect of the present invention.

The contrast of the back polarizing plate may be lower than the panel contrast. This also makes it possible to sufficiently achieve the effect of the present invention.

The optical element having polarization characteristics preferably has a moth-eye structure on the side facing away from the liquid crystal cell. This makes it possible to effectively achieve the effect of the present invention.

The back polarizing plate preferably has a higher transmittance than the front polarizing plate. This makes it possible effectively achieve the effect of the present invention.

The optical element having polarization characteristics preferably has a principal transmittance $k1$ of 80 to 86% and a principal transmittance $k2$ of 2 to 8%. This makes it possible effectively achieve the effect of the present invention.

At least one of the front polarizing plate and the back polarizing plate preferably has a retardation layer on the side facing the liquid crystal cell.

The liquid crystal cell preferably has a liquid crystal layer containing liquid crystal molecules arranged in a homeotropic alignment in the absence of an electric field.

The retardation layer is preferably a retardation film having an index ellipsoid that satisfies the condition: $nx \geq ny > nz$.

From the viewpoint of enhancing the contrast from an oblique viewing angle, it is preferable that the back polarizing plate include a retardation layer on the side facing the liquid crystal cell and that the liquid crystal cell include a liquid crystal layer containing liquid crystal molecules arranged in a homeotropic alignment in the absence of an electric field (hereinafter also referred to as a "third embodiment").

Further, from the viewpoint of more effectively enhancing the contrast from an oblique viewing angle, the back polarizing plate of the third embodiment preferably includes a negative C plate on the side facing the optical element having polarization characteristics.

The optical element having polarization characteristics preferably has a principal transmittance $k1$ of 82 to 84%.

The optical element having polarization characteristics preferably has a principal transmittance $k2$ of 2 to 6%.

The front polarizing plate preferably has a transmittance of 40 to 45%, more preferably 42 to 44%.

The back polarizing plate preferably has a transmittance of 42 to 48%, more preferably 43 to 46%.

The optical element having polarization characteristics is preferably a brightness enhancement film or a wire grid polarizer.

Advantageous Effects of Invention

The present invention allows to provide a liquid crystal display device that can achieve sufficient front contrast ratio and front white brightness at the same time.

DESCRIPTION OF EMBODIMENTS

Figure 1:
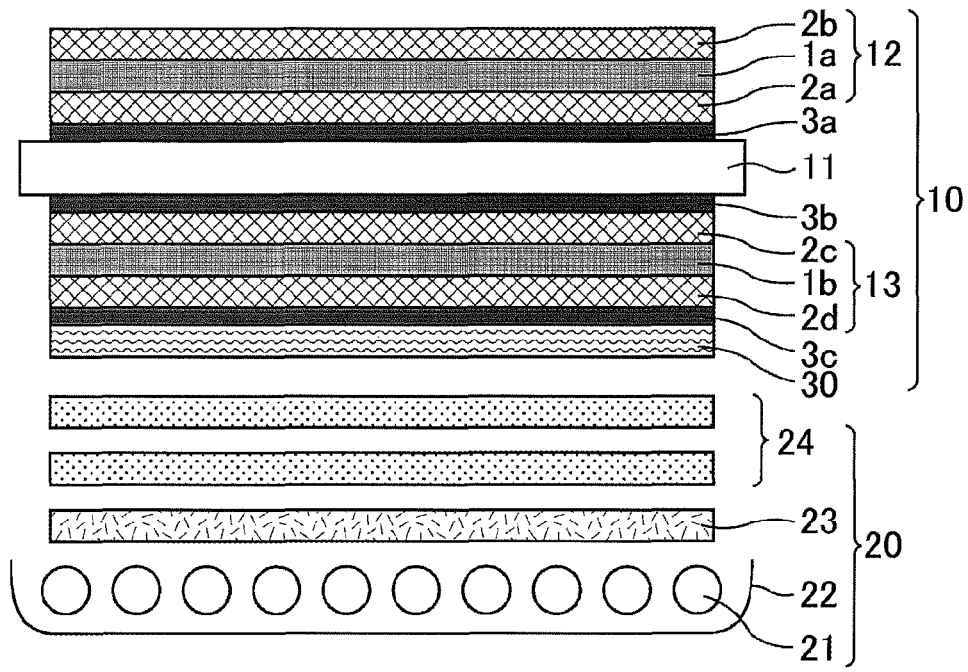
FIG. 1 is a cross-sectional schematic diagram of a liquid crystal display device of Embodiment 1.

The present invention will be mentioned in more detail referring to the drawings in the following embodiments, but is not limited to these embodiments.

The transmittance (single transmittance) herein is determined by measuring the value of Y after the luminosity was corrected, with a 2-degree field of view (with C illuminant) in accordance with JIS Z 8701-1982. Examples of measuring devices include an ultraviolet-visible spectrophotometer (trade name "V-7100" produced by JASCO Corporation).

The degree of polarization herein is determined by measuring the parallel transmittance (Tp) and the cross transmittance (Tc) of a polarizing plate using, for example, the above-described ultraviolet-visible spectrophotometer, and applying the following formula: degree of polarization (%)={(Tp−Tc)/(Tp+Tc)}$^{1/2}$×100.

The parallel transmittance (Tp) is a value of the transmittance of a parallel-laminate polarizer produced by laminating two polarizing elements of the same kind (the front polarizing plate, the back polarizing plate, or the optical element having polarization characteristics) in such a manner that the absorption axes of these polarizing elements are parallel to each other.

The parallel transmittance (Tp) is determined by the formula: $(k1^2+k2^2)/2$.

The values "k1" and "k2" indicate the principal transmittance. The principal transmittance k1 is the transmittance of a polarizing element determined when linearly-polarized light enters the polarizing element and the vibration direction of the linearly-polarized light is parallel to the transmission axis of the polarizing element. The principal transmittance k2 is the transmittance of a polarizing element determined when linearly-polarized light enters the polarizing element and the vibration direction of the linearly-polarized light is parallel to the absorption axis of the polarizing element.

The cross transmittance (Tc) is a value of the transmittance of a cross-laminated polarizer produced by laminating two polarizing elements of the same kind (the front polarizing plate, the back polarizing plate, or the optical element having polarization characteristics) in such a manner that the absorption axes of these polarizing elements perpendicularly intersect each other.

The cross transmittance (Tc) is determined by the formula: k1×k2.

The principal transmittance k1 and the principal transmittance k2 are determined by measuring the value of Y after the luminosity was corrected, with a 2-degree field of view (with C illuminant) in accordance with JIS Z 8701-1982. Examples of measuring devices include an ultraviolet-visible spectrophotometer (trade name "V-7100" produced by JASCO Corporation).

Herein, the contrast (CR) of each of the polarizing elements (the front polarizing plate, the back polarizing plate, and the optical element having polarization characteristics) is determined by measuring the parallel transmittance (Tp) and the cross transmittance (Tc) of the polarizing element and applying the following formula: CR=Tp/Tc.

Other terms and symbols used herein are defined as follows.

(1) Principal Refractive Indices (nx, ny, and nz)

The symbol "nx" represents a refractive index in the direction in which the in-plane refractive index reaches a maximum value (i.e., in the slow axis direction). The symbol "ny" represents a refractive index in the direction perpendicularly intersecting the slow axis in the same plane. The symbol "nz" represents a refractive index in the thickness direction.

(2) In-plane Retardation Value

The in-plane retardation value (Re[λ]) refers to an in-plane retardation value of a film at a wavelength λ (nm) at a temperature of 23° C. The Re[λ] is determined by the formula Re[λ]=(nx−ny)×d, where "d" represents the thickness of the film (in nm).

(3) Retardation Value in the Thickness Direction

The retardation value in the thickness direction (Rth[λ]) refers to a thickness retardation value of a film at a wavelength λ (nm) at a temperature of 23° C. The Re[λ] is determined by the formula Rth[λ]=(nx−nz)×d, where "d" represents the thickness of the film (in nm).

(Embodiment 1)

As shown in FIG. 1, the liquid crystal display device of the present embodiment includes a liquid crystal panel 10 and a backlight 20 disposed behind the liquid crystal panel 10. The backlight 20 includes a cold cathode tube 21 as a light source; a container 22 for holding the cold cathode tube 21; and a diffuser 23 and multiple optical sheets 24 disposed above the cold cathode tube 21 (on the side facing the liquid crystal panel 10). The diffuser 23 and the multiple optical sheets 24 are disposed in this order in the direction from the cold cathode tube 21 side to the liquid crystal panel 10 side. The liquid crystal panel 10 includes a VA-mode liquid crystal cell 11; a front polarizing plate (polarizing plate on the viewing side) 12 disposed on the front main surface (the surface facing the viewing side) of the liquid crystal cell 11; a back polarizing plate (polarizing plate on the backlight side) 13 disposed on the back main surface (the surface facing the backlight 20) of the liquid crystal cell 11; and an optical element having polarization characteristics (optical member) 30 disposed on the back polarizing plate 13, on the side facing the backlight 20.

The front polarizing plate 12 includes a first polarizer 1a, a first protective layer 2a, and a second protective layer 2b; and the protective layer 2a, the polarizer 1a, and the protective layer 2b are laminated in this order from the liquid crystal cell 11 side.

The back polarizing plate 13 includes a second polarizer 1b, a third protective layer 2c, and a fourth protective layer 2d;

and the protective layer 2c, the polarizer 1b, and the protective layer 2d are laminated in this order from the liquid crystal cell 11 side.

The front polarizing plate 12 is attached to the liquid crystal cell 11 via a first adhesive layer 3a, and the back polarizing plate 13 is attached to the liquid crystal cell 11 via a second adhesive layer 3b, and the optical element 30 having polarization characteristics is attached to the back polarizing plate 13 via a third adhesive layer 3c.

Although the figure shows a case where a direct backlight is employed as the backlight 20, the backlight 20 may be of a side-light type, for example. In the case where a side-light type backlight is used, the backlight 20 preferably further includes a light guide plate and a light reflector.

In the liquid crystal display device of the present embodiment, the back polarizing plate 13 has a lower contrast than the front polarizing plate 12, and there is substantially no air layer between the back polarizing plate 13 and the optical element 30 having polarization characteristics. This configuration makes it possible to maintain the front contrast ratio (contrast ratio in the front direction, i.e., in the normal direction of the panel surface) of the liquid crystal display device, and enhance the front white brightness at the same time.

Each component of the liquid crystal display device of the present embodiment is described in more detail below.

<A. Outline of the Liquid Crystal Panel>

The liquid crystal panel 10 is preferably a normally black liquid crystal panel. As used herein, the term "normally black type" refers to a liquid crystal panel designed to have the lowest transmittance (a state where the screen is black) when no voltage is applied, and to have a high transmittance when voltage is applied. The effect of the present invention is particularly significant with a normally black liquid crystal panel that shows black display when no voltage is applied. The reason thereofor is believed to be that the effect achieved using the two polarizing plates 12 and 13 having different contrasts is not impaired by driving of liquid crystal molecules.

From the above viewpoint, the transmission axis of the front polarizing plate 12 and the transmission axis of the back polarizing plate 13 are preferably disposed such that they substantially perpendicularly intersect each other in a plan view of the liquid crystal panel 10. Specifically, the front polarizing plate 12 and the back polarizing plate 13 are preferably arranged in crossed Nicols. Further, the transmission axis of the back polarizing plate 13 and the transmission axis of the optical element 30 having polarization characteristics are disposed such that they are substantially parallel to each other in a plan view of the liquid crystal panel 10. More specifically, in a plan view of the liquid crystal panel 10, the angle formed by the transmission axis of the front polarizing plate 12 and the transmission axis of the back polarizing plate 13 is preferably within the range of 90°±1° (more preferably 90°±0.3°), and the angle formed by the transmission axis of the back polarizing plate 13 and the transmission axis of the optical element 30 having polarization characteristics is preferably within the range of 0°±1° (more preferably 0°±0.3°). When these two angles are outside the ranges of 90°±1° and 0°±1°, respectively, i.e., when these angles are out of their respective numerical ranges, a decrease in the contrast may be observed in a view from the front.

Any layer may be disposed between each component of the liquid crystal panel 10. For example, any retardation film may be disposed between the front polarizing plate 12 and the liquid crystal cell 11 and/or between the back polarizing plate 13 and the liquid crystal cell 11. When a retardation film is used, any appropriate positional relationship can be selected for the relationship between the slow axis of the retardation film and the absorption axis of the adjacent polarizing plate, according to the driving mode of the liquid crystal cell.

The transmittance (T2) of the back polarizing plate 13 is preferably higher than the transmittance (T1) of the front polarizing plate 12. In this way, the contrast of the polarizing plate 12 and the contrast of the polarizing plate 13 can be easily set in the above-described relationship.

The difference ($\Delta T=T2-T1$) between the transmittance (T2) and the transmittance (T1) is preferably 0.5 to 6.0%, more preferably 2.0 to 4.0%. With a $\Delta T$ of less than 0.5%, the effect of enhancing the front white brightness may not be sufficiently obtained. On the other hand, a $\Delta T$ of more than 6.0% may result in a decrease in the front contrast ratio.

Usually, the difference ($\Delta CR=CR1-CR2$) between the contrast (CR2) of the back polarizing plate 13 and the contrast (CR1) of the front polarizing plate 12 can be suitably set within the range from 2000 to 30000. With a $\Delta CR$ of less than 2000, the effect of enhancing the front white brightness may not be sufficiently obtained. On the other hand, a $\Delta T$ of more than 30000 may result in a decrease in the front contrast ratio.

<B. Liquid Crystal Cell>

Any appropriate liquid crystal cell may be employed as the liquid crystal cell 11. Examples of the liquid crystal cell 11 include an active-matrix liquid crystal cell having a thin-film transistor, and a passive-matrix liquid crystal cell (a super twist nematic liquid crystal display device as a typical example).

The liquid crystal cell 11 preferably has a pair of substrates and a liquid crystal layer as a display medium sandwiched by the pair of substrates. One substrate (active matrix substrate) includes a switching element (TFT as a typical example) for controlling the electro-optical characteristics of the liquid crystals; scanning lines for providing gating signals to the switching element; and signal lines for providing source signals to the switching element. The other substrate (color filter substrate) is provided with color filters. The color filters may be provided on the active matrix substrate. Alternatively, the color filters may be dispensed with when an RGB tri-color light source is used as the lighting means of the liquid crystal display device as in the case of a field sequential liquid crystal display device. The space between the two substrates is controlled by a spacer. Each substrate has, for example, a polyimide alignment film on the side that is in contact with the liquid crystal layer.

The liquid crystal cell 11 has a liquid crystal layer (VA liquid crystals) containing liquid crystal molecules arranged in a homeotropic alignment in the absence of an electric field. Accordingly, it is possible to substantially eliminate the effect of the liquid crystal molecules on polarized light (transmitted light) in the absence of an electric field (black display state) in the front direction, and to reduce the causes of depolarization between the front polarizing plate 12 and the back polarizing plate 13. Hence, the effect of the present invention can be more effectively achieved. As used herein, the term "homeotropic alignment" refers to an alignment with the alignment vectors of the liquid crystal molecules being uniformly perpendicular to the substrate plane, as a result of the interaction between the alignment-treated or alignment-untreated substrate and the liquid crystal molecules. The homeotropic alignment as used herein encompasses the case where the liquid crystal molecules tilt slightly relative to the substrate plane, i.e., the case where the liquid crystal molecules have a pretilt angle.

The index ellipsoid of the liquid crystal cell 11 satisfies a relationship of $nz>nx=ny$. Herein, "$nx=ny$" encompasses not only the case where nx and ny are completely equal to each other but also the case where nx and ny are substantially equal to each other. Typical examples of the liquid crystal cell 11 according to the classification by the driving mode include liquid crystal cells of vertical alignment (VA) mode and vertical alignment twisted nematic (VAIN) mode. The VA-mode liquid crystal cell may have a multi-domain structure formed with an electrode having a slit or a substrate having protrusions formed on the surface thereof. The VATN-mode liquid crystal cell may also have a multi-domain structure.

The Rth[550] of the liquid crystal cell 11 in the absence of an electric field is preferably −270 to −360 nm, more preferably −290 to −340 nm. The cell gap (inter-substrate gap) of the liquid crystal cell 11 is usually 2.0 to 4.0 µm (preferably 2.5 to 3.5 µm).

<C. Polarizing Plate>

Any appropriate polarizing plates can be used as the front polarizing plate 12 and the back polarizing plate 13 as long as the contrasts of these plates satisfies the above-described relationship. As used herein, the "polarizing plate" refers to a polarizing plate that converts natural light or polarized light into linearly polarized light. Preferably, the polarizing plate has a function to divide the incident light into two polarization components that perpendicularly intersect each other; to transmit one polarization component through the polarizing plate; and absorb, reflect, and/or scatter the other polarization component by the polarizing plate.

The thickness of the front polarizing plate 12 and the back polarizing plate 13 is not particularly limited, and includes the general concept of thickness as in the thickness of a thin film, a film, or a sheet. The thickness of the front polarizing plate 12 and the back polarizing plate 13 is preferably 1 to 250 µm, more preferably 20 to 250 µm. The front polarizing plate 12 and the back polarizing plate 13 having a thickness in the above range can result in excellent mechanical strength.

The transmittance (T1) of the front polarizing plate 12 is preferably 40 to 45%, more preferably 42 to 44%. With a T1 of less than 40%, the effect of enhancing the front white brightness may not be sufficiently obtained. On the other hand, a T1 of more than 45% may result in a decrease in the front contrast ratio.

The transmittance (T2) of the back polarizing plate 13 is preferably 42 to 48%, more preferably 43 to 46%. With a T2 of less than 42%, the front contrast ratio may be decreased. On the other hand, with a T1 of more than 48%, the effect of enhancing the front white brightness may not be sufficiently obtained.

Usually, the contrast (CR1) of the front polarizing plate 12 can be suitably set within the range of 2000 to 60000. With a CR1 of less than 2000, while the effect of the present invention can be obtained, the front contrast ratio of the liquid crystal display device may be too low. On the other hand, a CR1 of more than 60000 may cause a decrease in the front white brightness.

Usually, the contrast (CR2) of the back polarizing plate 13 can be appropriately set within the range of 300 to 35000. A CR2 of less than 300 may cause a decrease in the front contrast ratio. On the other hand, with a CR2 of more than 35000, while the effect of the present invention can be obtained, the front contrast ratio may be decreased.

The liquid crystal panel 10 can be produced by, for example, selecting commercially available polarizing plates having different contrasts, and appropriately combining these selected plates. Preferably, the liquid crystal panel 10 is produced by appropriately adjusting the contrasts of the front polarizing plate 12 and the back polarizing plate 13 to achieve a high front contrast ratio, according to the driving mode, application, and the like of the liquid crystal cell 11.

Examples of the methods for increasing or decreasing the transmittances and the contrasts of the front polarizing plate 12 and the back polarizing plate 13 include a method for adjusting the amount of iodine in the polarizers in the case where polarizers mainly containing an iodine-containing polyvinyl alcohol resin are used as the polarizers 1a and 1b. Increasing the amount of iodine in the polarizers can allow the front polarizing plate 12 and the back polarizing plate 13 to have low transmittances and high contrasts. On the other hand, decreasing the amount of iodine in the polarizers can allow the front polarizing plate 12 and the back polarizing plate 13 to have high transmittances and low contrasts. This method is applicable to the production of roll-like front polarizing plate and back polarizing plate as well as sheet-like front polarizing plate and back polarizing plate.

<C-1. Polarizer>

Any appropriate polarizes can be employed as the polarizers 1a and 1b. Preferably, each of the polarizers 1a and 1b mainly contains an iodine-containing polyvinyl alcohol resin. Thereby, the front polarizing plate 12 and the back polarizing plate 13 can have excellent optical characteristics. In this case, the polarizers 1a and 1b can be usually obtained by mixing iodine with a polymer film (PVA film) mainly containing a polyvinyl alcohol resin and subsequently stretching the resulting mixture.

A commercially available PVA film can be used as-is as the PVA film described above. Examples of commercially available PVA films include "Kuraray Vinylon Film" (trade name) produced by Kuraray Co., Ltd., "Tohcello Vinylon Film" (trade name) produced by Mitsui Chemicals Tohcello Co., Ltd., and "Nichigo Vinylon Film" (trade name) produced by Nippon Synthetic Chemical Industry Co., Ltd.

<C-2. Protective Layer>

The front polarizing plate 12 includes the polarizer 1a, and the protective layers 2a and 2b sandwiching the polarizer 1a. The back polarizing plate 13 includes the polarizer 1b, and the protective layers 2c and 2d sandwiching the polarizer 1b. The protective layers 2a to 2d can prevent, for example, shrinkage, expansion, and UV-induced deterioration of the polarizers 1a and 1b. As a result, the durability of the front polarizing plate 12 and the back polarizing plate 13 can be improved.

The protective layers 2a and 2b are each attached to the polarizer 1a via any appropriate bonding layer (not shown). Further, the protective layers 2c and 2d are each attached to the polarizer 1b via any appropriate bonding layer (not shown).

As used herein, the "bonding layer" refers to a layer that bonds surfaces of adjacent optical members and integrates these members with practically sufficient bonding strength in a practically sufficient adhesion time. Examples of materials for forming the bonding layer include bonds and anchor coating agents. The bonding layer may have a multilayer structure in which an anchor coating layer is formed on the surface of an adherend, and a bonding agent layer is formed on the anchor coating layer. The adhesive layer may also be a thin layer invisible to the naked eyes (such a layer is also referred to as a hairline).

In the case where the polarizers 1a and 1b mainly contain an iodine-containing polyvinyl alcohol resin, a preferable material for forming the bonding layer is a water-soluble bond. The water-soluble bond is preferably a water-soluble bond mainly containing a polyvinyl alcohol resin. A commercially available bond can also be used as-is to form the above bonding layer. Alternatively, a commercially available bond can be used by being mixed with a solvent or an additive. Examples of the commercially available bonds mainly containing a polyvinyl alcohol resin include "GOHSEFIMER Z200" (trade name) produced by Nippon Synthetic Chemical Industry Co., Ltd.

The water-soluble bond may further contain a crosslinking agent as an additive. Examples of crosslinking agents include amine compounds, aldehyde compounds, methylol compounds, epoxy compounds, isocyanate compounds, and polyvalent metal salts. A commercially available crosslinking agent can also be used as-is as the above crosslinking agent. Examples of commercially available crosslinking agents include "Glyoxal" (trade name), which is an aldehyde compound produced by Nippon Synthetic Chemical Industry Co., Ltd. The amount of the crosslinking agent added may be suitably adjusted according to the purpose, and is usually more than 0 parts by weight and not more than 10 parts by weight relative to 100 parts by weight of the solids content of the water-soluble bond.

<First Protective Layer>

The first protective layer 2a is disposed on the polarizer 1a, on the side facing the liquid crystal cell 11. Any appropriate value may be selected for the thickness of the protective layer 2a according to the purpose. The thickness of the protective layer 2a is preferably 20 to 100 μm. With the thickness of the protective layer 2a within the above range, it is possible to obtain a polarizing plate having excellent mechanical strength and durability.

Because the protective layer 2a is disposed between the polarizers 1a and 1b, there is a case where the optical characteristics of the protective layer 2a affect the display characteristics of the liquid crystal display device. Therefore, the protective layer 2a preferably has high optical transparency and an appropriate retardation value. Specifically, the protective layer 2a may also serve a function to enlarge the viewing angle of the liquid crystal cell 11 (a layer having such a function is also referred to as an optical compensation layer). From the viewpoint of improving the durability of the polarizer 1a, the protective layer 2a preferably has excellent heat resistance, moisture permeability, and mechanical strength. From the viewpoint of improving adhesion to the polarizer 1a, the protective layer 2a preferably has excellent surface smoothness and adhesion to the bond. From the viewpoint of improving adhesion to the liquid crystal cell 11, the protective layer 2a preferably has excellent adhesion to the adhesive.

Any appropriate material may be employed as the material for forming the protective layer 2a. Examples thereof include polymer films made of a norbornene resin and polymer films made of a cellulose resin. Of these, polymer films made of a norbornene resin is most preferable from the viewpoint of suppressing the occurrence of uneven light leakage during black display due to uneven temperature and the like.

A commercially available film can be used as-is as the protective layer 2a. Alternatively, it is also possible to use a commercially available film to which secondary processing such as stretching treatment and/or shrinking treatment was applied so as to provide the film with the function of the retardation film for optical compensation. Examples of commercially available polymer films made of a cellulose resin include "FUJITAC" (trade name) produced by Fuji Photo Film Co., Ltd. and "KC8UX2M" (trade name) produced by Konica Minolta Opto, Inc. Examples of polymer films made of a norbornene resin include "ZEONOR Film" (trade name) produced by Zeon Corporation and "ARTON" (trade name) produced by JSR Corporation.

<Second Protective Layer>

The second protective layer 2b is disposed on the polarizer 1a, on the side opposite the liquid crystal cell 11. Any appropriate protective layer may be employed as the second protective layer 2b. From the viewpoint of improving the durability of the polarizer 1a, the protective layer 2b preferably has excellent heat resistance, moisture permeability, and mechanical strength. From the viewpoint of improving adhesion to the polarizer 1a, the protective layer 2b preferably has excellent surface smoothness and adhesion to the bond.

Any appropriate material may be employed as the material for forming the protective layer 2b. The protective layer 2b is preferably a polymer film made of a cellulose resin from the viewpoint of adhesion to the polarizer 1a. The polymer film made of a cellulose resin is preferably the same as that used for the protective layer 2a.

The protective layer 2b may be subjected to any appropriate treatment on the surface thereof as long as the above-described contrast relationship is satisfied. For example, a commercially available, surface-treated polymer film can be used as-is as the second protective layer 2b. Alternatively, a commercially available polymer film can be used by applying any surface treatment thereto. Examples of the surface treatment include diffusion treatment (anti-glare treatment), reflection preventing treatment (anti-reflection treatment), hard coat treatment, and antistatic treatment. Examples of commercially available, diffusion-treated (anti-glare-treated) products include AG150, AGS1, AGS2, and AGT1 produced by Nitto Denko Corporation. Examples of commercially available, reflection prevention-treated (anti-reflection-treated) products include ARS and ARC produced by Nitto Denko Corporation. Examples of commercially available, hard coat- and antistatic-treated films include "KC8UX-HA" (trade name) produced by Konica Minolta Opto, Inc.

<Surface-Treated Layer>

A surface-treated layer may be provided, if needed, on the protective layer 2b, on the side opposite the polarizer 1a. Any appropriate layer may be employed as the surface-treated layer according to the purpose. Examples thereof include diffusion-treated (anti-glare-treated) layers, reflection prevention-treated (anti-reflection treated) layers, hard coat-treated layers, and antistatic-treated layers. These surface-treated layers are used in order to prevent the contamination or damage of the screen and also to prevent a decrease in the visibility of a display image due to reflection of fluorescent light in the room or sunlight on the screen. A layer in which a treatment agent for forming the above-described treated layer is strongly adhered to the surface of a base film is commonly used as a surface-treated layer. The base film may also serve as the protective layer 2b. Further, the surface-treated layer may have a multilayer structure, for example, in which a hard coat-treated layer is laminated on an antistatic treatment layer. Examples of commercially available surface-treated layers to which reflection prevention treatment is applied include ReaLook series produced by NOF Corporation.

Additionally, the surface-treated layer preferably has a moth-eye structure. This further enhances the white brightness and thus further enhances the effect of the present invention. Additionally, the surface reflection in a bright room is reduced, and the effect of the present invention can therefore be fully exhibited even in a bright room. The moth-eye structure is, for example, a pattern of fine bumps, in which the pitch of the bumps is set to be equal to or smaller than the wavelength of visible light. The pattern of bumps is usually formed on the surface of a resin layer, and the resin layer is usually provided on a base film. The moth-eye structure can be produced in any way, for example, according to the method disclosed in WO 2006/059686.

<Third Protective Layer>

The third protective layer 2c is disposed on the polarizer 1b, on the side facing the liquid crystal cell 11. Any appropriate material, characteristics, conditions, and the like described above for the protective layer 2a can be employed for the protective layer 2c. The protective layer 2a and the protective layer 2c may be the same or different from each other.

<Fourth Protective Layer>

The fourth protective layer 2d is disposed on the polarizer 1b, on the side opposite the liquid crystal cell 11. Any appropriate material, characteristics, conditions, and the like described above for the protective layer 2b can be employed for the protective layer 2d. The protective layer 2b and the protective layer 2d may be the same or different from each other.

The thickness retardation value Rth[550] of the protective layer 2d is preferably 100 nm (more preferably 70 nm) or less. A value of more than 100 nm may result in a decrease in the contrast from an oblique viewing angle.

Additionally, the retardation value Re[550] of the protective layer 2d does not have to be 0 nm as long as the value is within a range that allows the effect of the present invention to be achieved. The value is preferably 10 nm (more preferably 5 nm) or less. A value of more than 10 nm may result in a decrease in the front contrast due to the angle between the axis of protective layer 2d and the axis of the polarizer 1b.

Further, at least one of the protective layers 2a and 2c preferably serves the role of a retardation film (optical compensation layer) for optical compensation (viewing angle compensation). In this way, it is possible to reduce light leakage in an oblique direction during black display. This can reduce the amount of light that was originally emitted in an oblique direction but is output in the front direction as a result of being scattered by the surface-treated layer or the like. Accordingly, the effect of the present invention can be more effectively achieved.

The index ellipsoid of the retardation film is preferably such that the principal refractive indices, i.e., nx, ny, and nz, satisfy a relationship of nx≥ny>nz. Thereby, in the liquid crystal cell 11 having an index ellipsoid satisfying a relationship of nz>nx=ny, it is possible to effectively reduce light leakage in an oblique direction during black display. Accordingly, in the liquid crystal cell 11, it is possible to reduce the amount of light that was originally emitted in an oblique direction but is output in the front direction as a result of being scattered by the surface-treated layer or the like. As a result, the effect of the present invention can be more effectively exhibited on the liquid crystal cell 11.

More specifically, the retardation film satisfying a relationship of nx>ny>nz can be achieved by the following configurations, for example: a configuration in which a retardation film satisfying a relationship of nx>ny>nz is disposed as the first protective layer or the third protective layer; a configuration in which a retardation film satisfying a relationship of nx=ny>nz is disposed as one of the first protective layer and the third protective layer, and another retardation film satisfying a relationship of nx>ny>nz is disposed as the other of the first protective layer and the third protective layer; and a configuration in which a retardation film satisfying a relationship of nx>ny>nz is disposed as the first protective layer, and another retardation film satisfying a relationship of nx>ny>nz is disposed as the third protective layer. The combination of retardation films and the specific retardation value are not particularly limited and can be arbitrarily set, as long as the configuration is designed to reduce light leakage in an oblique direction.

The front polarizing plate 12 and the back polarizing plate 13 each may only consist of a single layer (polarizer) having a polarizing function. The front polarizing plate 12 and the back polarizing plate 13 each may also be a laminate including two or more layers.

<D. Adhesive Layer>

An appropriate adhesive is selected as a material for forming the adhesive layers 3a to 3c. An anchor coating agent may also be contained. Note that the adhesive is a viscoelastic material that exhibits pressure- or contact-sensitive adhesion at room temperature. A material for forming the adhesive layers 3a to 3c is preferably an acrylic adhesive containing an acrylic polymer as the base polymer because such an adhesive is excellent in transparency, adhesion, weather resistance, and heat resistance. The thickness of the adhesive layers 3a to 3c can be appropriately adjusted according to the material and application of the adherent. Usually, the thickness is 5 to 50 μm (preferably 10 to 30 μm) and is larger than the thickness of the bonding layer.

<E. Optical Element Having Polarization Characteristics>

Any optical element may be used as the optical element 30 having polarization characteristics as long as the optical element has a function to divide the incident light into two polarization components that perpendicularly intersect each other; to transmit one polarization component through the polarizing plate; and to absorb or reflect the other polarization component by the optical element. Examples thereof include wire grid polarizers, iodine-based polarizers, and dye-based polarizers. From the viewpoint of further enhancing the brightness (white brightness) when a white image is displayed on the liquid crystal display device, the use of a brightness enhancement film or a wire grid polarizer having a function to reflect a polarization component that is not transmitted is preferable. Such a use is preferable also from the view of effective utilization of light because it allows the light that is not transmitted to be reflected and reused.

Preferably, the optical element 30 having polarization characteristics has a principal transmittance k1 of 80 to 86% (more preferably 82 to 84%), and a principal transmittance k2 of 2 to 8% (more preferably 2 to 6%). Thereby, the effect of the present invention can be more effectively achieved.

When the principal transmittance k2 of the optical element 30 having polarization characteristics is high, the cross transmittance thereof is high. Accordingly, in the case where the optical element 30 having polarization characteristics is combined with the back polarizing plate 13, a high-contrast polarizing plate is necessary as the back polarizing plate 13 in order to maintain the contrast of the liquid crystal display device. This consequently requires the use of a low-transmittance polarizing plate as the back polarizing plate 13, and it is thus believed to make it difficult to enhance the front white brightness.

In contrast, when the principal transmittance k2 of the optical element 30 having polarization characteristics is low, the cross transmittance thereof is low. This eliminates the need to use a high-contrast polarizing plate as the back polarizing plate 13 for maintaining the contrast of the liquid crystal display device. Therefore, a high-transmittance polarizing plate can be used as the back polarizing plate 13, and it is thus believed to make it easy to enhance the front white brightness.

A principal transmittance k1 of less than 80% may result in a decrease in the front white brightness. On the other hand, a principal transmittance k1 of more than 86% makes it difficult to maintain the compatibility with the principal transmittance k2

A principal transmittance k2 of more than 8% may result in a decrease in the front contrast ratio. On the other hand, a principal transmittance k2 of less than 2% may result in a decrease in the front white brightness.

Figure 2:
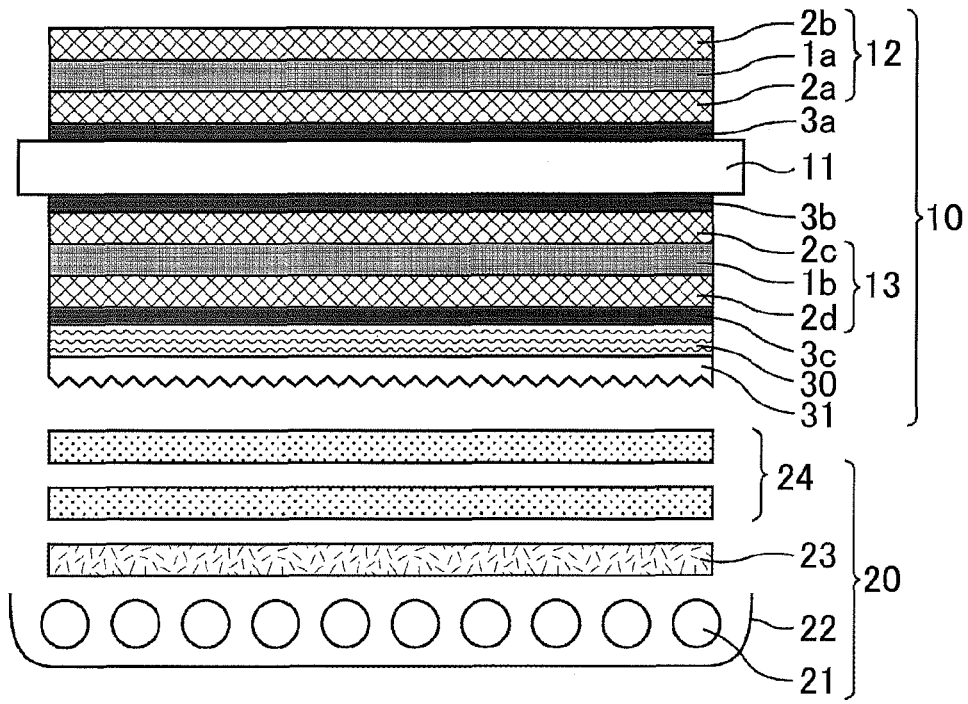
FIG. 2 is a cross-sectional schematic diagram of a modified example of the liquid crystal display device of Embodiment 1.

As shown in FIG. 2, a surface-treated layer 31 is preferably provided on the optical element 30 having polarization characteristics, on the side opposite the polarizer 1a. The surface-treated layer 31 has the above-described moth-eye structure on the surface facing the backlight 20. This allows a significant reduction in reflection on the interface between the optical element 30 having polarization characteristics and the air layer, thus allowing effective enhancement of the front white brightness.

The surface-treated layer 31 may be directly formed on the optical element 30 having polarization characteristics, or may be attached thereto via an adhesive layer or the like.

<E-1. Brightness Enhancement Film>

The above-described brightness enhancement film is used to enhance the white brightness of the liquid crystal display device. The brightness enhancement film is preferably a laminate including a thermoplastic resin layer (A) and a thermoplastic resin layer (B). A representative brightness enhancement film is a film having the thermoplastic resin layers (A) and the thermoplastic resin layers (B), which are arranged alternately (i.e., ABABAB and so forth). The number of layers constituting the brightness enhancement film is preferably 2 to 20, more preferably 2 to 15. The thus-configured brightness enhancement film is produced, for example, by co-extruding two types of resins and extending the extruded film. The total thickness of the brightness enhancement film is preferably 20 to 800 μm.

Preferably, the thermoplastic resin layer (A) is optically anisotropic. The thermoplastic resin layer (A) preferably has an in-plane birefringence (ΔnA) of 0.05 or more, more preferably 0.1 or more, and still more preferably 0.15 or more. From the viewpoint of optical homogeneity, the upper limit of the ΔnA is preferably 0.2. Herein, the ΔnA represents the difference (nxA−nyA) between nxA (refractive index in the slow axis direction) and nyA (refractive index in the fast axis direction).

Preferably, the thermoplastic resin layer (B) is substantially optically anisotropic. The thermoplastic resin layer (B) preferably has an in-plane birefringence (ΔnB) of $5\times10^{-4}$ or less, more preferably $1\times10^{-4}$ or less, and still more preferably $0.5\times10^{-4}$ or less. The lower limit of the ΔnB is preferably $0.01\times10^{-4}$. Herein, the ΔnB represents the difference (nxB−nyB) between nxB (refractive index in the slow axis direction) and nyB (refractive index in the fast axis direction).

Preferably, nyA of the thermoplastic resin layer (A) and nyB of the thermoplastic resin layer (B) are substantially identical to each other. The absolute value of the difference between nyA and nyB is preferably $5\times10^{-4}$ or less, more preferably $1\times10^{-4}$ or less, and still more preferably $0.5\times10^{-4}$ or less. A brightness enhancing film having such optical characteristics has an excellent function to reflect a polarization component.

Any appropriate resin may be selected as the resin for forming the thermoplastic resin layer (A). The thermoplastic resin layer (A) preferably contains a polyethylene terephthalate resin, a polytrimethylene terephthalate resin, a polybutylene terephthalate resin, a polyethylene naphthalate resin, a polybutylene naphthalate resin, or a mixture thereof. These resins show excellent birefringence induced by stretching, and have excellent birefringence stability after stretching.

Any appropriate layer may be selected as the thermoplastic resin layer (B). The thermoplastic resin layer (B) preferably contains a polystyrene resin, a polymethyl methacrylate resin, a polystyrene glycidyl methacrylate resin, or a mixture thereof. These resins may contain halogen groups such as chlorine, bromine, and iodine in order to increase the refractive index. Alternatively, these resins may contain any additive in order to adjust the refractive index.

<E-2. Wire Grid Polarizer>

The wire grid polarizer is used to enhance the white brightness of the liquid crystal display device. The wire grid polarizer is preferably arranged such that conductive lines such as metal on a substrate form slits at a specific pitch. When the above pitch is significantly smaller (for example, ½ or less) than that of incident light (for example, a wavelength of visible light from 400 to 800 nm), the wire grid polarizer reflects most of the electric field vector components vibrating in a direction parallel to the conductive lines, and transmits most of the electric field vector components perpendicular to the conductive lines. Thus, single polarization can be achieved.

The wire grid polarizer can be produced in any way, for example, according to the method disclosed in JP-A 2005-70456. The performance (transmittance and contrast) of the wire grid polarizer can be changed by adjusting the width, cycle (pitch), and height (thickness) of the conductive lines (metal wires). More specifically, in the present embodiment, the ratio W/P of the width W and the cycle (pitch) P of the conductive lines is preferably 25 to 50%, more preferably 30 to 42%. The cycle (pitch) of the conductive lines is preferably 500 nm or less, more preferably 200 nm or less. Further, the thickness of each conductive line is preferably 10 to 300 nm, more preferably 80 to 150 nm.

Usable materials of the conductive line include gold, silver, copper, aluminum, iron, nickel, titanium, tungsten, etc., as well as alloys thereof. Of these, the use of aluminum is most preferable in view of the fact that aluminum has a high reflectivity and flat wavelength dependency in visible light and is likely to maintain a high reflectivity against changes (haze) over time.

<F. Optical Sheet>

The number and the type of the optical sheets 24 are not particularly limited, and can be arbitrarily selected. In this way, a part of the optical members illustrated in FIG. 1 may be dispensed with or replaced by another optical member, according to the lighting method of the liquid crystal display device, driving mode of the liquid crystal cell, application, and the like, as long as the effect of the present invention is achieved. Examples of the optical sheets 24 include prism sheets (for example, "BEF" (trade name) produced by Sumitomo 3M Limited) and diffusion sheets (for example, "OPALUS" (trade name) produced by KEIWA Inc.). The prism sheets change the angle of light output in a regular manner so as to enhance the white brightness of the liquid crystal panel in the normal direction. The diffusion sheets change the angle of light output in an irregular manner so as to enhance the white brightness of the liquid crystal panel in the normal direction and make the uneven luminance of the cold cathode tube 21 less noticeable.

<G. Diffuser>

The diffuser 23 diffuses the light emitted from the cold cathode tube 21 to achieve surface emission. The diffuser 23 makes the uneven brightness of the cold cathode tube 21 less noticeable by diffusing the light emitted from the cold cathode tube 21 in the plane direction. The diffuser 23 is made from, for example, a resin such as a polycarbonate resin and an acrylic resin. The material, thickness, haze value, and the like of the diffuser 23 are not particularly limited.

The liquid crystal display device of the present embodiment is used for any appropriate application. Examples of applications include OA equipment such as PC monitors, laptops, and copy machines; portable devices such as cell phones, watches, digital cameras, personal digital assistants (PDAs), and handheld game consoles; household electrical equipment such as video cameras, televisions, and microwaves; vehicle equipment such as back monitors, car-navigation system monitors, and car audios; exhibition equipment such as information monitors for commercial stores; security equipment such as surveillance monitors; and nursing care and medical equipment such as monitors for nursing care and monitors for medical use.

The liquid crystal display device of the present embodiment is preferably applied to a television. The screen size of the television is preferably 17" (373 mm×224 mm) wide or larger, more preferably 23" (499 mm×300 mm) wide or larger, and still more preferably 32" (687 mm×412 mm) wide or larger.

(Embodiment 2)

Figure 3:
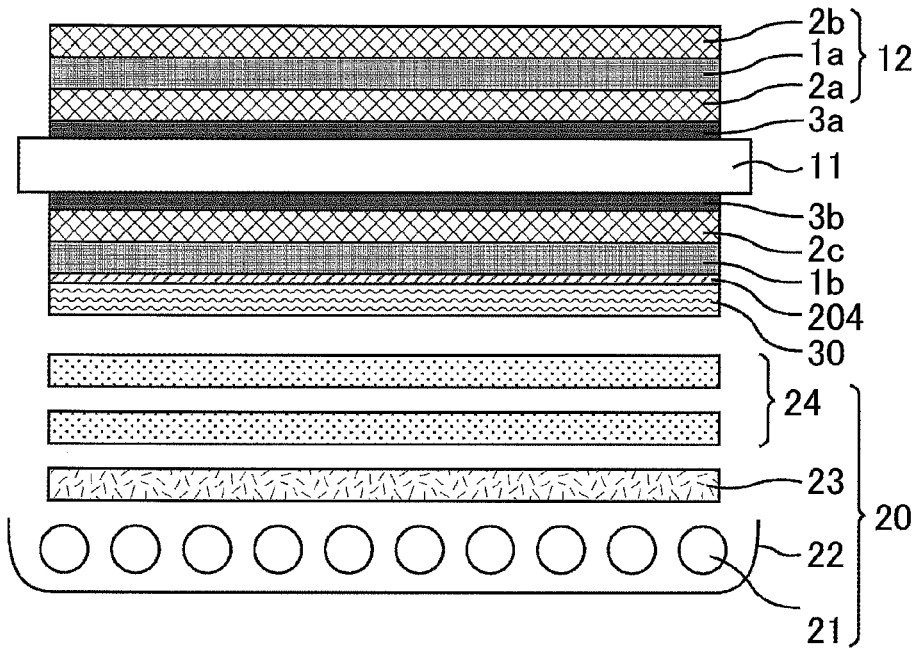
FIG. 3 is a cross-sectional schematic diagram of a liquid crystal display device of Embodiment 2.

As shown in FIG. 3, the liquid crystal display device of Embodiment 2 is the same as the liquid crystal display device of Embodiment 1, except that the protective layer 2d is not provided and the optical element 30 having polarization characteristics is directly attached to the polarizer 1b via a bonding layer 204.

The bonding layer 204 can be formed in the same manner as the bonding layer between the protective layer 2d and the polarizer 1a, which was described in Embodiment 1. In other words, any appropriate material, characteristics, conditions, and the like described above for the above-described bonding layer can be employed for the bonding layer 204.

The liquid crystal display device of the present embodiment also makes it possible to enhance the front white brightness of the liquid crystal display device while maintaining the front contrast ratio (contrast ratio in the front direction) thereof.

Further, because the liquid crystal display device of the present embodiment does not include the protective layer 2d, the liquid crystal display device can be made thinner than the liquid crystal display device of Embodiment 1.

(Embodiment 3)

Figure 4:
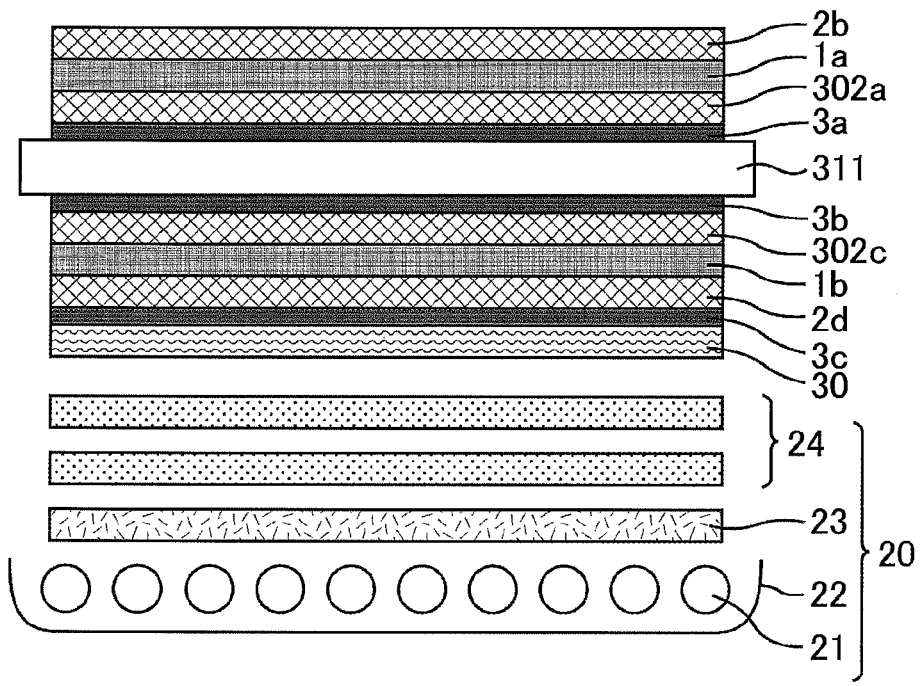
FIG. 4 is a cross-sectional schematic diagram of a liquid crystal display device of Embodiment 3.

As shown in FIG. 4, the liquid crystal display device of Embodiment 3 is the same as the liquid crystal display device of Embodiment 1, except that a liquid crystal cell 311, a first protective layer 302a, and a third protective layer 302c are provided instead of the liquid crystal cell 11, the first protective layer 2a, and the third protective layer 2c. The liquid crystal cell 311 is the same as the liquid crystal cell 11 except for the points described below. The protective layers 302a and 302c are the same as the protective layers 2a and 2c except for the points described below.

The liquid crystal cell 311 includes a liquid crystal layer (horizontally aligned liquid crystal layer) containing liquid crystal molecules arranged in a homogeneous alignment in the absence of an electric field. As used herein, the term "homogeneous alignment" refers to an alignment with the alignment vectors of the liquid crystal molecules being uniformly parallel to the substrate plane, as a result of the interaction between the alignment-treated substrate and the liquid crystal molecules. The homogeneous alignment as used herein encompasses the case where the liquid crystal molecules tilt slightly relative to the substrate plane, i.e., the case where the liquid crystal molecules have a pretilt angle.

The liquid crystal cell 311 has an index ellipsoid satisfying a relationship of nx>ny=nz. Herein, "ny=nz" encompasses not only the case where ny and nz are completely equal to each other but also the case where ny and nz are substantially equal to each other. Typical examples of the liquid crystal cell 311 according to the classification by the driving mode include liquid crystal cells of in-plane switching (IPS) mode, fringe field switching (FFS) mode, and a ferroelectric liquid crystal (FLC) mode. The IPS-mode liquid crystal cell and the FFS-mode liquid crystal cell may have a V-shaped electrode, a zigzag-shaped electrode, or the like.

The liquid crystal cell 311 may be in so-called O-mode or E-mode, with E-mode being preferable. With E-mode operation, the front contrast ratio can be further enhanced. In the case where the liquid crystal cell 311 is in O-mode, the absorption axis direction of the back polarizing plate 13 is substantially parallel to the initial alignment direction of the liquid crystal cell 311 (the direction in which the in-plane refractive index of the liquid crystal cell 311 reaches a maximum value in the absence of an electric field). In the case where the liquid crystal cell 311 is in E-mode, the absorption axis direction of the back polarizing plate 13 substantially perpendicularly intersects the initial alignment direction of the liquid crystal cell 311.

<First Protective Layer>

Preferably, the first protective layer 302a is substantially optically anisotropic. As used herein, the phrase "substantially optically anisotropic" encompasses a layer in which the Re[550] is less than 10 nm and the absolute value of the thickness retardation value (|Rth[550]|) is less than 10 nm.

The Re[550] of the protective layer 302a is preferably less than 10 nm, more preferably 8 nm or less, and still more preferably 5 nm or less. With the Re[550] within the above range, it is possible to suppress the occurrence of color shift in an oblique direction.

The |Rth[550]| (the absolute value of Rth[550]) of the protective layer 302a is preferably less than 10 nm, more preferably 8 nm or less, and still more preferably 5 nm or less. With the |Rth[550]| within the above range, it is possible to suppress the occurrence of color shift in an oblique direction.

Any appropriate materials can be employed as the material for forming the protective layer 302a. The protective layer 302a is preferably a polymer film containing a cellulose resin. Because the cellulose resin has excellent adhesion to polarizers, it can suppress lifting or peeling between a polarizer and a protective layer even in a high temperature and high humidity environment.

A commercially available film can be used as-is as the protective layer 302a. Alternatively, it is also possible to use a commercially available film to which secondary processing such as stretching treatment and/or shrinking treatment was applied so as to provide the film with the function of the retardation film for optical compensation. Examples of commercially available polymer films made of a cellulose resin include "FUJITAC" (trade name) produced by Fuji Photo Film Co., Ltd., and "KC8UX2M" (trade name) produced by Konica Minolta Opto, Inc.

<Third Protective Layer>

Any appropriate material, characteristics, conditions, and the like described above for the protective layer 302a can be employed for the third protective layer 302c. The protective layer 302a and the protective layer 302c may be the same or different from each other. Preferably, the protective layer 302c is substantially optically anisotropic.

(Embodiment 4)

Figure 5:
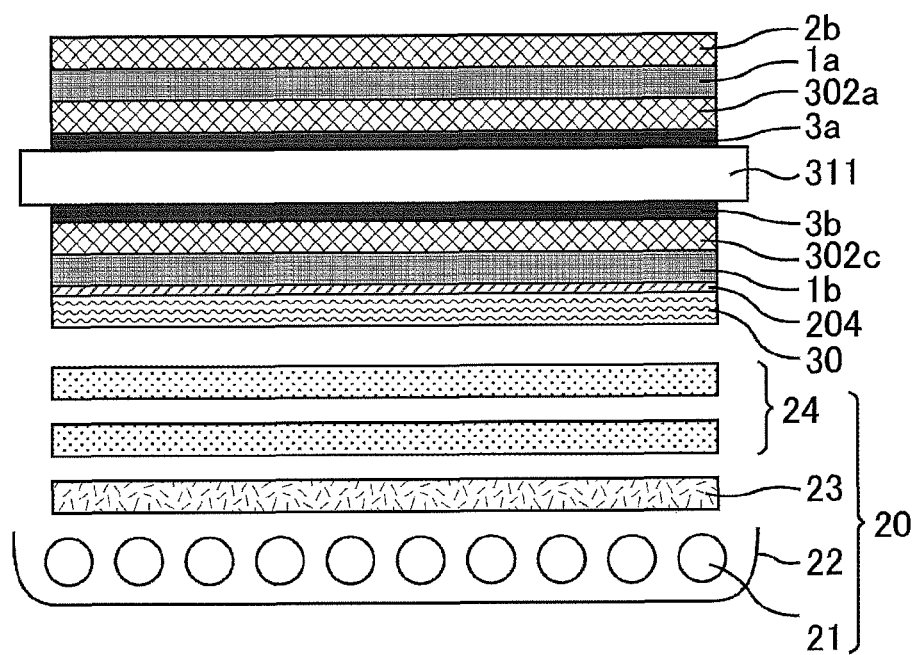
FIG. 5 is a cross-sectional schematic diagram of a liquid crystal display device of Embodiment 4.

As shown in FIG. 5, the liquid crystal display device of Embodiment 4 is the same as the liquid crystal display device of Embodiment 3, except that the protective layer 2d is not provided and the optical element 30 having polarization characteristics is directly attached to the polarizer 1b via the bonding layer 204 described in Embodiment 2.

The liquid crystal display device of the present embodiment also makes it possible to enhance the front white brightness of the liquid crystal display device while maintaining the front contrast ratio (contrast ratio in the front direction) thereof.

Further, because the liquid crystal display device of the present embodiment does not include the protective layer 2d, the liquid crystal display device can be made thinner than the liquid crystal display device of Embodiment 3.

The aforementioned embodiments may be employed in appropriate combination as long as the combination is not beyond the spirit of the present invention.

EXAMPLE 1

A method for producing a liquid crystal display device of Example 1 is described below.

First, a front polarizing plate was attached to a VA-mode liquid crystal cell, on its main surface facing the viewing side, via an acrylic adhesive (thickness of 20 μm). The Rth[550] of the liquid crystal cell was 315 nm. The front polarizing plate was provided with polarizer A (i.e., an iodine-containing PVA film), and two TAC films attached one each to both main sides of polarizer A by roll-to-roll. Each TAC film had a thickness of 80 μm, an Re[550] of 2 nm, and an Rth[550] of 60 nm.

Next, a back polarizing plate was attached to the liquid crystal cell, on its main surface facing the backlight, via an acrylic adhesive (thickness of 20 μm). The back polarizing plate was provided with polarizer B (i.e., an iodine-containing PVA film), a retardation film attached to one main surface of polarizer B by roll-to-roll, and a TAC film attached to the other main surface of polarizer B by roll-to-roll. The retardation film had a thickness of 60 μm, satisfied a relationship of nx>ny>nz, and had an Re[550] of 54.8 nm and an Rth[550] of 124.5 nm. The retardation film was disposed such that the in-plane slow axis thereof is parallel to the absorption axis of the back polarizing plate. The TAC film had a thickness of 80 μm, an Re[550] of 2 nm, and an Rth[550] of 49 nm. The retardation film was disposed on the side facing the liquid crystal cell, and the TAC film was disposed on the side facing the backlight.

The front polarizing plate and the back polarizing plate were arranged in crossed Nicols such that the absorption axes of these polarizing plates perpendicularly intersect each other. The absorption axis of the front polarizing plate and the absorption axis of the back polarizing plate were disposed at generally 45 degrees relative to the direction in which the liquid crystal molecules tilt when a voltage is applied, in a plan view of the liquid crystal cell.

Next, a brightness enhancement film ("DBEF" (trade name) produced by Sumitomo 3M Limited) was attached to the back polarizing plate, on its main surface facing the backlight, via an acrylic adhesive (thickness of 20 μm), thereby producing a liquid crystal panel. The back polarizing plate and the brightness enhancement film were arranged in parallel Nicols such that their absorption axes are parallel to each other.

Lastly, a backlight was disposed to face the brightness enhancement film, on the side opposite the liquid crystal cell. Thereby, a liquid crystal display device of Example 1 was produced.

EXAMPLE 2

A liquid crystal display device of Example 2 was produced in the same manner as in Example 1, except that polarizer C was used instead of polarizer B. Polarizer C is an iodine-containing PVA film.

EXAMPLE 3

A liquid crystal display device of Example 3 was produced in the same manner as in Example 1, except that polarizer D was used instead of polarizer B. Polarizer D is an iodine-containing PVA film.

EXAMPLE 4

A liquid crystal display device of Example 4 was produced in the same manner as in Example 1, except that polarizer B was used instead of polarizer A and polarizer C was used instead of polarizer B.

EXAMPLE 5

A liquid crystal display device of Example 5 was produced in the same manner as in Example 4, except that polarizer D was used instead of polarizer C.

EXAMPLE 6

A liquid crystal display device of Example 6 was produced in the same manner as in Example 1, except that polarizer C was used instead of polarizer A and polarizer D was used instead of polarizer B.

COMPARATIVE EXAMPLE 1

A liquid crystal display device of Comparative Example 1 was produced in the same manner as in Example 1, except that polarizer A was used instead of polarizer B and the brightness enhancement film was not attached to the back polarizing plate. In the present Comparative Example, the liquid crystal panel was simply directly placed on the brightness enhancement film.

COMPARATIVE EXAMPLE 2

A liquid crystal display device of Comparative Example 2 was produced in the same manner as in Example 1, except that polarizer A was used instead of polarizer B.

COMPARATIVE EXAMPLE 3

A liquid crystal display device of Comparative Example 3 was produced in the same manner as in Example 4, except that polarizer A was used instead of polarizer C.

COMPARATIVE EXAMPLE 4

A liquid crystal display device of Comparative Example 4 was produced in the same manner as in Example 4, except that polarizer B was used instead of polarizer C.

COMPARATIVE EXAMPLE 5

A liquid crystal display device of Comparative Example 5 was produced in the same manner as in Example 6, except that polarizer A was used instead of polarizer D.

COMPARATIVE EXAMPLE 6

A liquid crystal display device of Comparative Example 6 was produced in the same manner as in Example 6, except that polarizer B was used instead of polarizer D.

COMPARATIVE EXAMPLE 7

A liquid crystal display device of Comparative Example 7 was produced in the same manner as in Example 6, except that polarizer C was used instead of polarizer D.

Table 1 below shows characteristics of each polarizing plate. When the front polarizing plate and the back polarizing plate have the same polarizer, the front polarizing plate and the back polarizing plate have the same characteristics, in principle. Therefore, Table 1 makes no distinction between the front polarizing plate and the back polarizing plate.

TABLE 1

|  | k1 | k2 | Single Transmittance (%) | Parallel Transmittance (%) | Cross Transmittance (%) | CR | Degree of Polarization (%) |
|---|---|---|---|---|---|---|---|
| Polarizing plate including polarizer A | 84.2 | 0.0018 | 42.1 | 35.4 | 0.0015 | 23602 | 99.996 |
| Polarizing plate including polarizer B | 85.3 | 0.0031 | 42.6 | 36.4 | 0.0026 | 13802 | 99.993 |
| Polarizing plate including polarizer C | 86.2 | 0.0106 | 43.1 | 37.2 | 0.0091 | 4126 | 99.976 |
| Polarizing plate including polarizer D | 87.8 | 0.1327 | 44.0 | 38.6 | 0.1161 | 332 | 99.699 |

Table 2 shows the results obtained by measuring the front white brightness, the front black brightness, and the panel contrast of each Example and each Comparative Example. To simplify Table 2, the front white brightness is described as white brightness, and the front black brightness is described as black brightness in Table 2. Further, the white brightness increase rate indicates a ratio of the white brightness of each Example or each Comparative Example relative to the white brightness of Comparative Example 1. Additionally, the panel contrast indicates a front contrast ratio of the liquid crystal panel, i.e., members from the front polarizing plate to the brightness enhancement film (the optical element having polarization characteristics). The front white brightness, the front black brightness, and the panel contrast were measured by the following method under the following conditions. First, the front white brightness and the front black brightness were measured with a 1-degree field of view from a position 40 cm away from the liquid crystal panel in a dark-room environment, using a spectral-radiance meter ("SR-UL1" (trade name) produced by TOPCON CORPORATION). Then, the panel contrast was calculated from the following formula: panel contrast=front white brightness/front black brightness.

TABLE 2

|  | Front Polarizing Plate | Back Polarizing Plate | White Brightness (cd/m$^2$) | Black Brightness (cd/m$^2$) | Panel Contrast | White Brightness Increase Rate |
|---|---|---|---|---|---|---|
| Comparative Example 1 | Polarizer A | Polarizer A | 424.9 | 0.075 | 5665 | 1.000 |
| Comparative Example 2 | Polarizer A | Polarizer A | 436.8 | 0.077 | 5644 | 1.028 |
| Example 1 |  | Polarizer B | 440.7 | 0.083 | 5336 | 1.037 |
| Example 2 |  | Polarizer C | 448.4 | 0.084 | 5357 | 1.055 |
| Example 3 |  | Polarizer D | 461.1 | 0.133 | 3459 | 1.085 |
| Comparative Example 3 | Polarizer B | Polarizer A | 443.0 | 0.087 | 5121 | 1.043 |

TABLE 2-continued

| | Front Polarizing Plate | Back Polarizing Plate | White Brightness (cd/m²) | Black Brightness (cd/m²) | Panel Contrast | White Brightness Increase Rate |
|---|---|---|---|---|---|---|
| Comparative Example 4 | | Polarizer B | 451.5 | 0.090 | 5006 | 1.063 |
| Example 4 | | Polarizer C | 457.2 | 0.089 | 5166 | 1.076 |
| Example 5 | | Polarizer D | 465.3 | 0.147 | 3157 | 1.095 |
| Comparative Example 5 | Polarizer C | Polarizer A | 448.2 | 0.125 | 3583 | 1.055 |
| Comparative Example 6 | | Polarizer B | 453.4 | 0.127 | 3581 | 1.067 |
| Comparative Example 7 | | Polarizer C | 460.0 | 0.131 | 3525 | 1.083 |
| Example 6 | | Polarizer D | 468.4 | 0.191 | 2452 | 1.102 |

It was clear from the results that the front white brightness can be enhanced by attaching the brightness enhancement film to the back polarizing plate and preventing air from entering therebetween. Further, a comparison between Examples and Comparative Examples in which the front polarizing plates have the same polarizer showed that it is possible to enhance the front white brightness while maintaining the panel contrast as much as possible by setting the CR of the back polarizing plate lower than that of the front polarizing plate.

The present application claims priority to Patent Application No. 2010-153183 filed in Japan on Jul. 5, 2010 under the Paris Convention and provisions of national law in a designated State, the entire contents of which are hereby incorporated by reference.

REFERENCE SIGNS LIST 1a and 1b: polarizers
2a, 2b, 2c, 2d, 302a, and 302c: protective layers
3a, 3b, and 3c: adhesive layers
10: liquid crystal panel
11 and 311: liquid crystal cell
12: front polarizing plate
13: back polarizing plates
20: backlight
21: cold-cathode tube
22: container
23: diffuser
24: optical sheet
30: optical element having polarization characteristics
31: surface-treated layer
204: bonding layer

The invention claimed is:

1. A liquid crystal display device comprising:
a front polarizing plate;
a liquid crystal cell;
a back polarizing plate; and
an optical element having polarization characteristics, the components being arranged in the stated order,
wherein the back polarizing plate has a lower contrast than the front polarizing plate, and
there is substantially no air layer between the back polarizing plate and the optical element having polarization characteristics.

2. The liquid crystal display device according to claim 1, wherein the back polarizing plate comprises a protective layer on the side facing the optical element having polarization characteristics, and
the optical element having polarization characteristics is attached to the protective layer.

3. The liquid crystal display device according to claim 2, wherein the optical element having polarization characteristics is attached to the protective layer via an adhesive layer.

4. The liquid crystal display device according to claim 1, wherein the optical element having polarization characteristics is attached to a polarizer of the back polarizing plate.

5. The liquid crystal display device according to claim 4, wherein the optical element having polarization characteristics is attached to the polarizer via a bonding layer.

6. The liquid crystal display device according to claim 1, wherein the back polarizing plate has a contrast of 300 or higher, and
the difference in the contrast between the back polarizing plate and the front polarizing plate is 3500 or more.

7. The liquid crystal display device according to claim 1, wherein the contrast of the back polarizing plate is lower than a panel contrast.

8. The liquid crystal display device according to claim 1, wherein the optical element having polarization characteristics includes a moth-eye structure on the side opposite to the liquid crystal cell.

9. The liquid crystal display device according to claim 1, wherein the back polarizing plate has a higher transmittance than the front polarizing plate.

10. The liquid crystal display device according to claim 1, wherein at least one of the front polarizing plate and the back polarizing plate comprises a retardation layer on the side facing the liquid crystal cell.

11. The liquid crystal display device according to claim 10, wherein the retardation layer is a retardation film having an index ellipsoid satisfying nx≥ny>nz.

12. The liquid crystal display device according to claim 1, wherein the liquid crystal cell comprises a liquid crystal layer containing liquid crystal molecules arranged in a homeotropic alignment in the absence of an electric field.

13. The liquid crystal display device according to claim 1, wherein the back polarizing plate comprises a retardation layer on the liquid crystal cell side, and
the liquid crystal cell comprises a liquid crystal layer containing liquid crystal molecules arranged in a homeotropic alignment in the absence of an electric field.

14. The liquid crystal display device according to claim 1, wherein the front polarizing plate has a transmittance of 40 to 45%.

15. The liquid crystal display device according to claim 14, wherein the front polarizing plate has a transmittance of 42 to 44%.

16. The liquid crystal display device according to claim 1, wherein the back polarizing plate has a transmittance of 42 to 48%.

17. The liquid crystal display device according to claim 16, wherein the back polarizing plate has a transmittance of 43 to 46%.

18. The liquid crystal display device according to claim 1, wherein the optical element having polarization characteristics is a brightness enhancement film or a wire grid polarizer.

* * * * *